Sept. 15, 1942.  W. A. WISSLER  2,295,702
METHOD OF AND APPARATUS FOR APPLYING METAL COATINGS
Filed Sept. 1, 1939   2 Sheets-Sheet 1

INVENTOR
WILLIAM A. WISSLER
BY
ATTORNEY

Sept. 15, 1942.   W. A. WISSLER   2,295,702
METHOD OF AND APPARATUS FOR APPLYING METAL COATINGS
Filed Sept. 1, 1939   2 Sheets-Sheet 2
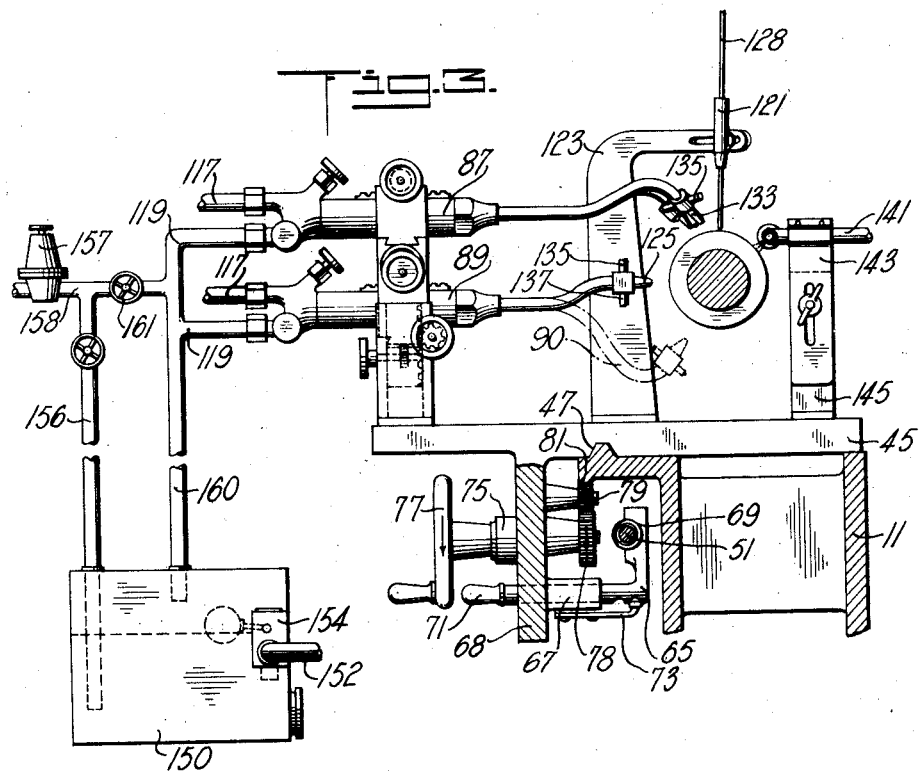
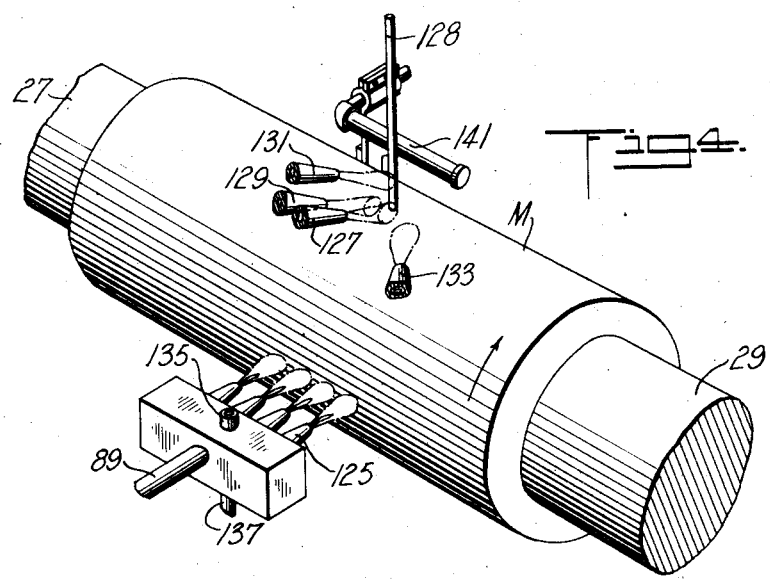
INVENTOR
WILLIAM A. WISSLER
BY
ATTORNEY Patented Sept. 15, 1942

2,295,702

UNITED STATES PATENT OFFICE 2,295,702

METHOD OF AND APPARATUS FOR APPLYING METAL COATINGS

William Arthur Wissler, Niagara Falls, N. Y., assignor to Haynes Stellite Company, a corporation of Indiana Application September 1, 1939, Serial No. 292,989

22 Claims. (Cl. 117—46)

The present invention relates to welding and brazing operations; and more especially it concerns a novel procedure and a novel apparatus for the continuous application of uniform, smooth, welded-on overlays, coatings, or facings upon the surfaces of metal articles, and portions thereof, having the general shape of solids of revolution. The invention has especial utility in connection with the deposition upon cylindrical metal articles of uniform layers of wear-resistant and corrosion-resistant metals and alloys, such as those of the class of non-ferrous alloys of cobalt, chromium, and tungsten, and the following description is directed principally to this example of the invention.

Welded-on overlays are now extensively used for forming on metal articles welded-on wear-resistant and corrosion-resistant coatings, as well as for many other applications wherein it is desirable to have upon the surface of a metal article a body of metal other than that of which the matrix is composed.

The deposition of welded-on overlays or facings of uniform thickness upon cylindrical articles heretofore has presented many practical difficulties not encountered in the deposition of overlays on articles intended for service wherein a smooth, continuous surface layer of the coating metal is not required. Prior attempts to apply to metal cylindrical articles uniform surface coatings of wear-resistant or of corrosion-resistant alloys, by manual autogenous gas welding procedures involving the welding of elongated bodies of the surfacing alloy in slightly overlapping parallel rows disposed longitudinally of the articles, have proved inefficient from the standpoint of both labor and fuel utilized. Such manual procedures are exceedingly tedious, and necessitate repeated fluxing and reheating of the rod and of the surfacing metal. Particularly when using hard-facing non-ferrous alloys of the type mentioned above, any smoothing of the very hard surface after its formation necessitates a lengthy, tedious, grinding procedure. Thus, it is very important, from a practical standpoint, that the original deposit of the surfacing metal be smooth and uniform, and that it be intimately bonded to the base metal; yet objectionable excessive inter-alloying of the two compositions should be avoided.

The present invention is based upon the discovery that by proceeding in the manner hereinafter described, a uniform, smooth, welded-on surface layer of a wear-resistant or a corrosion-resistant metal or alloy may be formed upon an article, or a portion thereof, having a surface in the shape of a surface of revolution, with a minimum of expense for materials and labor. The process is well adapted for standardization. After having determined the operating conditions most suitable for depositing a welded-on surface coating of a selected metal upon a metal article, such conditions can be maintained continuously or can be reproduced whenever desired.

According to one modification of the invention, the article to be surfaced is slowly rotated on its longitudinal axis. Concurrently therewith a welding rod of the metallic surfacing material, an end of which rests upon the surface of the rotating article, is fed forward, either mechanically or by gravity, as deposition of molten metal therefrom proceeds. One or more torches, hereinafter designated "a torch assembly," are mounted in fixed relation with respect to the welding rod; and this torch assembly and rod are moved as a unit longitudinally of the article, and at a fixed distance from the curved surface of the article, with the end of the rod contacting the latter. The torch or torches preferably are of the oxy-fuel gas type, utilizing mixtures of oxygen and acetylene.

The proportions of fuel gas and oxygen flowing to the torches are preferably adjusted to provide a gas mixture in which the volume of oxygen is less than that required for complete combustion of the fuel gas, for instance, an oxyacetylene mixture containing more than one volume of acetylene per volume of oxygen. The flames produced by the combustion of such mixtures are referred to herein as "carburizing flames"; as "excess fuel gas flames"; and as "excess acetylene oxyacetylene flames." The oxyacetylene mixtures described in the United States Patent No. 1,73,341 of Harry S. George, are well adapted for use in the process.

As the said torch assembly moves longitudinally of the rotating article being coated, those portions of the latter directly ahead of the welding rod may be preheated along a spiral path upon the surface of the rotating article,—adjacent convolutions of said spiral path having overlapping side margins. Preferably an excess acetylene oxyacetylene flame or its equivalent is used for the purpose, thereby carburizing the surface of the metal article adjacent the welding zone. Concurrently, a portion of the welding rod adjacent the article may be preheated and brought to a temperature of incipient fusion, preferably by an excess acetylene oxyacetylene flame. For completing the melting of the rod of surfacing metal, and for providing an initial, approximately uniform deposition thereof upon the surface of the article, a welding torch discharges an oxyacetylene flame upon the article at or near the point of contact of the rod therewith.

Under certain conditions of operation, the resultant metal overlay as it leaves the welding zone may have an irregular, rough or rippled surface conformation. These irregularities in surface contour are smoothed out at or adjacent the high temperature surfacing zone,—while the metal is still highly heated,—by means of an oxy-fuel gas torch, directed in manner to accomplish this purpose, and preferably using an excess acetylene oxyacetylene flame.

In many practical applications of the process it is advantageous continuously to apply at the high temperature surfacing zone a uniform amount of a fluxing material. This contributes greatly toward the prevention of pinholes in the metal overlay, and facilitates a suitable bond between the metal of the article and the surfacing metal without undue interalloying of these metals.

One especially convenient method for uniformly applying the flux involves the use of a volatile alkyl borate, either alone or in admixture with a suitable solvent. Examples of such fluxes are: distilled methyl or ethyl borate; a solution of distilled methyl borate in methanol; and a solution of distilled ethyl borate in ethanol. These fluxes, and procedures for their use, are set forth more fully in the copending application Serial No. 250,140 of A. R. Lytle and T. H. Vaughn, entitled "Volatile welding fluxes," filed January 10, 1939.

When employing volatile fluxes in the process, all or a selected portion of the welding gas flowing to one or more of the torches may be contacted with a liquid body of the flux composition under carefully regulated conditions whereby a uniform amount of flux is continuously fed to the surfacing zone with the welding gas mixture. Alternatively, a solid flux such as a borosilicate glass may be conducted to the surfacing zone uniformly in the form of a coating upon the welding rod of surfacing metal. If desired, a powdered solid flux composition such as borax may be fed uniformly to the surfacing zone by suitable automatic means available for such service. However, solid fluxes are not as amenable to accurate regulation as are the volatile fluxes mentioned; nor are the former as capable of ready and uniform distribution throughout the welding zone as the latter.

In the accompanying drawing, illustrating apparatus adapted for the practice of one form of the invention, Fig. 1 is a vertical section through one form of metal surfacing apparatus, taken along the line 1—1 of Fig. 2, looking in the direction of the arrows, parts being broken away, and other parts being omitted;

Fig. 3 is a vertical transverse section taken along the line 3—3 of Fig. 1, looking in the direction of the arrows, parts being broken away, and parts being omitted; and Fig. 4 is a partially diagrammatic perspective view showing the general disposition of the torches relative to the article being coated, parts being broken away.

Figure 1:
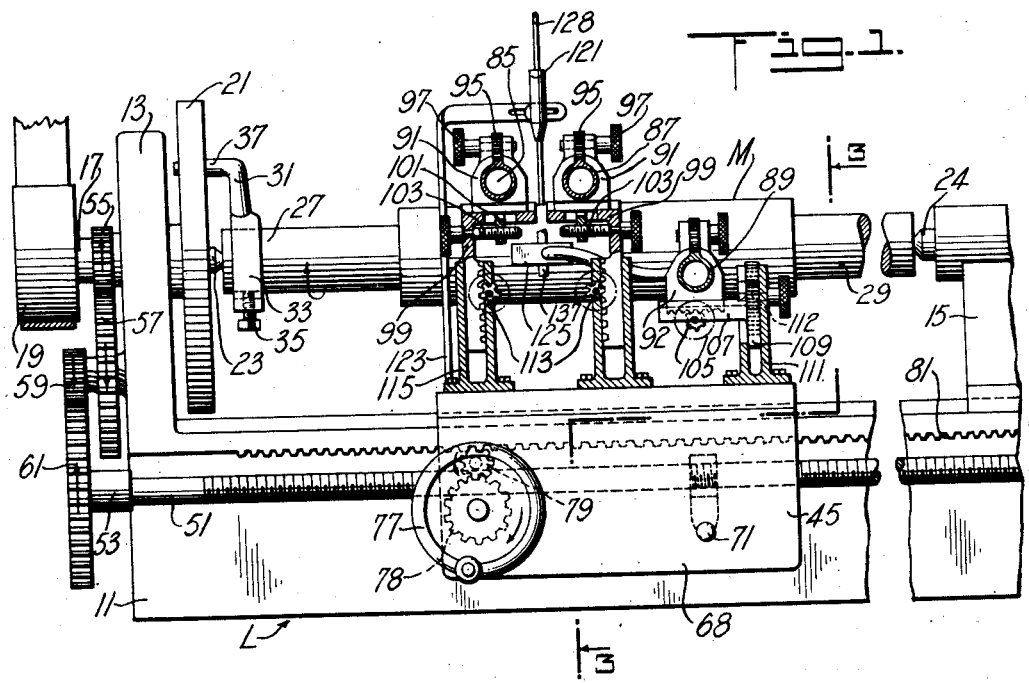

Referring to the drawings, a lathe L of one of the usual types is provided, having means for rotating a tubular article on its longitudinal axis while moving a tool-carrying bracket parallel to the longitudinal axis of said article. As illustrated, the lathe has a frame or bed 11, which may be mounted upon the floor or other suitable support.

For supporting for rotation a tubular metal article M to be provided with a welded-on surface coating of metal or alloy, the lathe has end brackets 13, 15. A rotatable shaft 17, driven from a suitable source of power (not shown) through a pulley 19 and belt, is mounted in bearings in the bracket 13, and has secured thereto rotatable lathe face plate 21. The latter is provided with a centering member 23.

Mounted in bearings in bracket 15 for rotation with respect thereto is a centering member 24, spaced by a bearing 25 from a thrust member 26 threaded for longitudinal axial movement within the bracket 15 and adapted to be secured therein in selected position by a lock nut or other means (not shown).

For supporting on the lathe the article to be surfaced, two tubular spacing members 27, 29 are provided, each having an end secured within the respective ends of the article M. The opposite ends of the spacing members are secured to and centered upon the respective centering members 23 and 24.

For rotating the article M and spacing members, a clamping dog 31 is secured upon the spacing member 27 by means of a collar 33 provided with a locking screw 35, and has a finger 37 extending through a suitable aperture within the face plate 21, whereby rotation of the latter causes rotation of the article M and the spacing members.

For supporting a plurality of torches and welding rod, and for moving the same as a unit longitudinally of the tubular article M, there is provided a shelf bracket 45 mounted on the lathe bed 11 and capable of longitudinal sliding movement relative to the latter. The bracket has a groove 47 (see Fig. 3) cooperating with a tongue in the lathe bed to insure alignment of these parts during such movement.

For moving the bracket 45 longitudinally of the article M, there is provided a threaded countershaft 51 having an unthreaded portion mounted for rotation in a bearing 53, driven by a series of reduction gears 55, 57, 59, and 61 from the shaft 17. For selectively engaging the bracket 45 and shaft 51 to cause movement of the bracket along the latter, a clutch member 65 (see Fig. 3) is slidably mounted in a housing 67 secured upon a front wall 68 of the bracket 45. The member 65 has a threaded half nut member 69 adapted to engage the threaded shaft 51 when the handle 71 is in the position shown in Fig. 3, and adapted to disengage the shaft 51 when the handle is moved to the right in Fig. 3. A spring lock member 73 carried by housing 67 serves to maintain the clutch 65 in selected position relative to shaft 51.

For manually moving the bracket 45 along the frame 11 when the clutch 65 is disengaged from shaft 51, there is provided a shaft 75 rotatably mounted upon the bracket 45. The shaft 75 has a handwheel 77 at one end, and a gear 78 at the other end, meshing with a gear 79 rotatably mounted on the bracket. The gear 79 also meshes with a rack 81 upon the adjacent lower surface of a portion of the lathe bed. The arrangement of parts is such that when clutch 65 is disengaged, the bracket 45 is movable along the lathe bed upon rotating handwheel 77.

Figure 2:
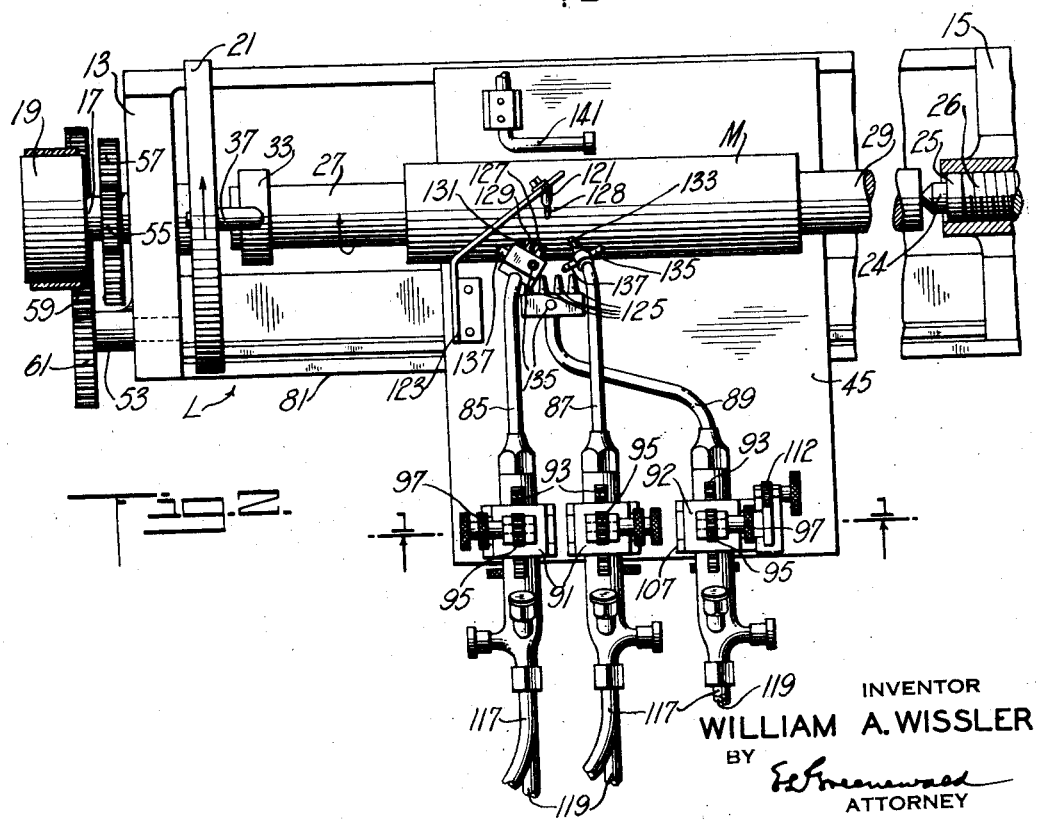
Fig. 2 is a plan view of the apparatus shown in Fig. 1, parts being broken away, and parts being shown in section.

For directing preheating and welding heat upon the surfaces of an article M, a plurality of oxy-fuel gas torches 85, 87, and 89, respectively, are supported upon bracket 45 for adjustment in each of three planes at right angles to each other. For this purpose, the respective torches are mounted for sliding movement in torch brackets 91, 91, 92 which, as shown in Fig. 2, is effected by means of racks 93 carried by the torches and which cooperate with pinions 95 that are rotated through knurled heads 97.

The brackets 91 are supported on respective members 99 for limited sliding movement longitudinally of the lathe; and for this purpose each bracket 91 has a depending portion 101 extending through a slot in a corresponding member 99. Each portion 101 is drilled and tapped to accommodate a threaded portion of a corresponding adjusting screw 103. These parts cooperate to permit movement of the brackets 91 longitudinally of the lathe.

As shown in Fig. 1, the bracket 92 has a rack meshing with a pinion 105 carried upon an arm 107 of a supporting member 109. The member 109 is mounted for vertical sliding movement along a vertical torch support member 111 under action of a pinion 112 carried by the latter and cooperating with a rack on the member 109. The arm 107 extends through a vertical slot in member 111.

The respective supporting members 99, 99 are vertically adjustable by means of racks formed on depending parts thereof which cooperate with pinions 113 rotatably mounted upon supporting members 115 secured upon the bracket 45.

Each of the torches 85, 87, 89 is provided with the usual, separately-controlled inlet connections 117, 119 for oxygen and a fuel gas, respectively. When a volatile flux is used, the flux vapors preferably are introduced uniformly into the welding zone in suspension in the fuel gas. For this purpose the fuel gas may be bubbled through a body of the volatile flux, in the manner described in the aforesaid pending application of A. R. Lytle and T. H. Vaughn.

For loosely supporting a welding rod of the surfacing metal or alloy with an end thereof resting upon the surface of the article M, a welding rod holder 121 is mounted for sliding adjustment on an arm of a supporting member 123 secured upon the bracket 45. A welding rod 128 extends through an aperture within said holder 121.

It will be seen that the construction and relationship of parts are such that the torches and welding rod are movable as a unit at a uniform selected rate longitudinally of the article M being surfaced, while the article is rotated at a uniform rate upon its longitudinal axis.

The torch assembly may include a plurality of closely-spaced preheating torch tips 125 connected with torch 89 and adapted to discharge flames upon the surface of the article M adjacent the surfacing zone. The preheating torch 89 may be omitted when surfacing articles of very small diameter or those having thin walls. When surfacing large articles, two or more of these batteries of preheating torch assemblies may be used, spaced around the periphery of the article. One such supplemental preheating assembly is shown at 90 in Fig. 3, and is connected with the torch 89.

In the form of torch assembly illustrated, there is connected with torch 85 a welding head having associated therewith a torch tip 127 directed to discharge a welding flame upon the article adjacent to and in line with the welding rod 128. A second tip 129, of approximately the same size as tip 127, is directed to discharge a preheating and welding flame upon the surface of the article slightly ahead of the rod in the direction of movement of the torch assembly. The flame from the tip 129 prepares the metal surface of the article by virtue of its excess acetylene content, and also causes the surfacing metal to flow out in a thin film just prior to the application of the bulk thereof to the article. A third tip 131, usually of smaller size than the others, directs a preheating flame upon the lower end of the welding rod and causes it to melt and flow more rapidly. It will be understood that if the article being coated is small, only one tip may be required.

Torch 87 has connected therewith at least one tip 133 directed to impinge an excess acetylene flame upon the surface of the deposited metal as it leaves the zone of influence of welding torch 85, and at a distance from the welding flame approximately equal to the distance travelled by the bracket 45 during one revolution of the article M. This torch 87 functions to smooth out ripples or other slight irregularities in surface conformation of the deposited metal while the latter still is at high temperature.

Each of the welding heads carrying the tips 125, 127, 129, 131, 133 preferably is provided with a cooling jacket, having the usual inlet 135 and outlet 137 for water or the equivalent which is circulated therethrough from a suitable source of supply.

For chilling the deposited metal coating as it leaves the welding zone, a conduit 141, which communicates with a source of supply of air or other suitable gas under low pressure, (not shown) is suitably supported upon the bracket 45 for vertical adjustment, by means of the cooperating slotted members 143, 145 and an associated lock nut. Conduit 141 has one or more apertures directed to discharge the gas upon the molten coating as it leaves the welding zone (see Fig. 3).

For dispensing a volatile flux such as methyl or ethyl borate in a fuel gas flowing to a welding zone, a container 150 for the flux (see Fig. 3) may be provided, having an inlet line 152 for the liquid flux, and a valve 154 for maintaining a constant liquid level in the container. A valve-controlled inlet line 156, which is connected with a fuel gas header 158 having therein a pressure regulator 157, may have its outlet below the liquid level in container 150. A fuel gas outlet line 160 connects the upper part of the container with one or more of the fuel gas lines 119, 119 of the torches. A regulating valve 161 is in header 158 between lines 156 and 160, and permits the dilution of the flux-containing welding gas with a selected portion of unfluxed welding gas as it flows to the torches.

In practicing the process of the invention, utilizing apparatus of the type described, a cylindrical article to be provided with a surface coating of wear- or corrosion-resistant alloy may be mounted in the apparatus in the manner described. The article is slowly rotated by means of the driven pulley 19 and associated parts, with the clutch 65 out of engagement with shaft 51. The supporting bracket 45 is then moved lengthwise of the lathe bed until the battery of torches are disposed to direct flames upon the cylindrical article at an end margin thereof. The preheating torch or torches 89 then is lighted and adjusted while continuing the rotation of the article until the adjacent portion of the surface of said article is preheated. Then the torches 85, 87 are lighted and adjusted; and a rod 128 of the surfacing metal or alloy is supported in contact with the article. The clutch 65 is then moved to engage the member 51, and slow, uniform movement of the bracket 45 and torches longitudinally of the article proceeds, as rotation of the cylindrical member continues in the direction of the arrow in the figures. The torches 89 and 85, preheat the base metal of the article and the adjacent portion of the welding rod by means of excess acetylene flames, and bring both said base metal and welding rod to a selected welding temperature in the welding or surfacing zone. The welding flux continuously is dispensed in uniform amount within the high temperature zone, either in the form of a volatile flux such as ethyl borate in suspension in the welding gas mixture; as a flux-coated rod of surfacing material; or as a finely-divided solid flux.

The use of preheating flames insures that the respective surfaces of the metal article and of the surfacing material at the welding zone will be at a constant temperature throughout the operation. As the movement of the bracket 45 continues, there is formed upon the cylindrical article a spirally welded-on overlay of the hard-facing or other surfacing metal or alloy, adjacent convolutions of said overlay having overlapping side margins. While the coated surface of the article is still at high temperature, an excess acetylene flame produced by the torch 87 is directed across the surface of the coated article at a slight angle to the path of rotation of the article, and remelts the metal that has been applied and has been allowed to cool during one complete revolution of the article. The remelted metal flows sufficiently to greatly reduce or eliminate any surface irregularities; after which the coated article is cooled, either naturally or by means of a current of air or other cooling medium. If desired, the torch 87 may be eliminated; and this smoothing operation can be conducted as a separate step after the coating of the article has been completed. However, it is more economical to perform both operations concurrently.

By the use of the invention it is possible to weld continuous metal strips of uniform width and thickness upon a cylindrical article, whereby the latter is completely covered with a smooth, tenacious welded metal coating of uniform selected thickness. The control of the process is readily attained by regulating the speed of rotation of the cylinder, the type of torch flames employed, the degree of preheating of the metal adjacent the welding zone, and the speed with which the welding torch assembly moves longitudinally of the cylinder. Obviously these conditions must be independently determined for each given type of work; but when once determined, the process may be performed continuously, using automatic or semi-automatic means for the purpose.

The following illustrates one specific application of the process for hard-facing a steel rod with a layer of a non-ferrous wear-resistant alloy of cobalt, chromium and tungsten, widely used as a hard-facing material and now being marketed under the tradename "Stellite." Using apparatus functioning in general like that shown in the drawings, a facing layer of "Stellite," approximately .125 inch in thickness, was welded upon a cylindrical steel bar 1.5 inches in diameter,—using a rod of the facing alloy that was about 0.188 inch in diameter. The steel bar was slowly rotated at a rate of 1.85 minutes per revolution. The rate of longitudinal movement of the bracket 45 (and the torches and rod holder carried thereby) was around .38 inch per revolution of the steel bar. Each of the flames was produced by the combustion of an oxyacetylene mixture containing an excess of acetylene over that capable of complete combustion by the oxygen present. A very satisfactory, smooth, welded surface coating of hard-facing metal was provided upon the steel rod, being thoroughly bonded to the latter. The use of a flux was not necessary in the example mentioned above, although it conveniently could be used. A flux, however, should be employed when providing welded hard-facing metallic coatings upon metal articles of larger diameter, such as those 5 or more inches in diameter, where the operation is slower, and where scale may otherwise form on the metal.

The surfaced article may be annealed when desired, following the welding-on or surfacing operation. This may be effected, for example, by means of the preheating torch 89 or equivalent means,—while rotating the article rapidly enough to produce uniform heating.

It sometimes is advantageous to chill the smooth deposited metal coating as it leaves the welding zone to prevent it from running out of its proper position. This chilling action readily may be effected, when desired, by directing a low-pressure stream of air or other suitable gas from conduit 141 upon the deposited coating as it leaves the welding zone.

The process is adapted for surfacing cylindrical articles with welded-on metal overlays of a wide variety of metals, such as copper and nickel; various ferrous alloys such as those containing chromium, tungsten, manganese, silicon, cobalt and nickel; non-ferrous alloys such as those of cobalt, chromium and tungsten; brass and bronzes; and the so-called diamond substitutes, which are essentially tungsten carbide.

By feeding the welding rod mechanically at a fixed rate to the welding zone, the advantages of a positive and controlled rate of feed are secured; and the process may be used for covering only a selected part of the circumference of the article, where such a partial surfacing is desired.

It will be understood by those skilled in the art that the invention is subject to wide modification within the spirit thereof. Thus, the smoothing operation is optional, and need not be performed where slight irregularities in the surface of the overlay are not objectionable. Furthermore, the irregularities in the overlay of facing metal may be smoothed out under an oxy-fuel gas flame following the completion of the welding process. Similarly, two or more spirally deposited bodies of surfacing metal simultaneously may be applied to the article instead of but one,—in the interests of economy of time and of material, and with important advantages in the conservation of heat.

It will be understood that, while the invention has been specifically illustrated in connection with the surface coating of a cylinder of revolution, it is equally applicable for the surface coating of other articles having surfaces of revolution. The process is most conveniently carried out when the top surface of the rotating article is substantially horizontal. Consequently, when coating non-cylindrical articles of revolution, the axis of revolution itself preferably is not horizontal.

The terms "carburizing flame," "excess fuel gas flame," "excess acetylene flame" and similar expressions appearing in the specification and claims are intended to designate flames produced by mixtures of fuel gas and oxygen wherein insufficient oxygen is present for complete combustion of the acetylene or other fuel gas present, as described in the aforementioned United States Patent No. 1,973,341 of Harry S. George.

1. A method of forming a metallic coating upon an elongated metal surface of revolution, comprising: rotating said surface at a uniform speed about a longitudinal axis while the uppermost portion of said surface is substantially horizontal; applying a welding flame against such rotating surface to define a welding zone, such flame providing sufficient heat to melt a body of such coating metal and to heat such surface to a welding temperature; feeding a body of such coating metal into said flame and against said rotating surface, thereby melting portions of said body of coating metal and depositing the molten metal upon and welding the same to successive portions of said surface as such surface portions pass said flame and said body of coating metal; moving said welding flame and said body of coating metal in unison along said surface in a direction longitudinally thereof while said surface is rotating and said molten metal is being deposited on and welded to said surface, thereby producing a continuous spiral deposit of metal upon said surface; and so correlating the intensity of said welding flame, the rate of rotation of said surface, and the rate of movement of said welding flame and said body of coating metal along said surface, that said spiral deposit is of substantially uniform width and thickness throughout, and the adjoining convolutions of the spiral deposit are sufficiently close together to provide a continuous and substantially uniform metallic coating upon said surface.

2. Process as defined in claim 1 wherein at least one oxy-fuel gas carburizing flame is utilized as said welding flame.

3. Process as defined in claim 1, including a step of applying preheating oxy-fuel gas flames to said surface and to said body of coating metal, respectively, adjacent said welding zone prior to the application of said welding flame.

4. Process as defined in claim 1, together with the step of continuously feeding a flux at a uniform rate to said welding zone concurrently with the application of said welding flame against said rotating surface.

5. Process as defined in claim 1, together with the step of continuously feeding a volatilizable liquid flux to said welding zone concurrently with the application of said welding flame against said rotating surface.

6. Process as defined in claim 1, together with a subsequent step of chilling the deposited metal as the latter leaves the welding zone.

7. Method as defined in claim 1, together with the step of smoothing out irregularities in the surface contour of the deposited metal by applying a flame thereto while such surface of revolution is rotating, said flame providing sufficient heat to remelt at least a portion of the deposited metal.

8. Method as defined in claim 1, together with the step of annealing the deposited metal by applying a flame thereto while rotating such surface of revolution.

9. Process of forming a metallic coating upon the cylindrical surface of a metal cylinder, comprising: rotating said cylinder at a uniform rate about its longitudinal axis while the latter is horizontally positioned; applying a welding flame against successive upper portions of the cylindrical surface of such rotating cylinder to define a welding zone, such flame providing sufficient heat to melt a body of a coating metal and to heat such surface to a welding temperature; feeding a body of such coating metal into said flame and against said rotating cylinder, thereby melting successive portions of said body of coating metal and depositing the molten metal upon and welding the same to successive portions of said surface as such surface portions pass said flame and said body of coating metal; moving said flame and said body of coating metal in unison along said surface in a direction parallel to said longitudinal axis while said cylinder is rotating and said molten metal is being deposited on and welded to said surface, thereby producing a continuous spiral deposit of metal upon said surface; and so correlating the intensity of said welding flame, the rate of rotation of said cylinder, and the rate of movement of said flame and said body of coating metal parallel to said axis, that said spiral deposit is of substantially uniform width and thickness throughout, and the adjoining convolutions of the spiral deposit are sufficiently close together to provide a continuous and substantially uniform metallic coating upon said surface.

10. Process for forming a uniform welded-on metallic surface coating upon the cylindrical surface of a metal article, which comprises directing a preheating carburizing flame along a spiral path upon the surface of said article, adjacent convolutions of said spiral path having overlapping side margins, said preheating flame providing sufficient heat to form a thin film of molten metal on said article, preheating a body of said coating metal by means of a carburizing flame providing sufficient heat to form a molten film of said coating metal, depositing said coating metal at a uniform rate upon successive portions of the surface of the article, in the presence of a carburizing flame, and smoothing irregularities in the surface contour of the deposited metal while the latter is at high pressure.

11. Process for forming a continuous, smooth, welded metal coating upon a metal article having the general shape of a cylinder of revolution, which comprises continuously rotating said article, continuously preheating by means of an oxy-fuel gas carburizing flame successive portions of the surface of said article along a spiral path, adjacent portions of which overlap each other, depositing upon the surface of the article thus preheated a body of facing metal in a welding zone continuously maintained at a substantially constant temperature by means of at least one carburizing flame providing sufficient heat to melt such facing metal, and continuously moving said flames as a unit at a uniform selected rate longitudinally of said cylindrical article, thereby applying a continuous layer of molten facing metal in a spiral path upon the surface of the metal article, adjacent convolutions of said facing metal having overlapping side margins.

12. Process for forming a continuous welded coating of wear-resistant metal upon a cylindrical metal article, which comprises rotating said article on its longitudinal axis, continuously preheating successive portions of the surface of said article by means of an oxy-fuel gas carburizing flame, depositing upon the preheated surface successive portions of a wear-resistant metal by means of at least one oxy-fuel gas carburizing flame, continuously moving said preheating and metal depositing flames as a unit at a uniform selected rate longitudinally of said article, thereby applying a continuous layer of molten facing metal in a spiral path upon the surface of said article, adjacent convolutions of said facing metal having overlapping side margins, and, while the deposited metal is still at high temperature, smoothing out the exposed surface of facing metal by means of an oxy-fuel gas flame as rapidly as the coating is formed.

13. Process as defined in claim 12, wherein the application of the layer of facing metal to the metal article is effected in the presence of a volatile flux continuously supplied at a uniform rate to the melting zone within said oxy-fuel gas.

14. Process for forming a coating of a nonferrous hard-facing metal upon a cylindrical metal article, which comprises rotating said article uniformly upon its longitudinal axis, preheating said article along a spiral path lying on the surface of said article by means of an oxy-fuel gas carburizing flame, concurrently preheating a body of hard-facing metal and progressively contacting it with successive portions of the surface of the article thus preheated while concurrently melting a film of the facing metal and welding it to the contacted surface of the moving article, thereby depositing at a uniform rate within a shifting welding zone a continuous layer of molten facing metal in a spiral path upon the surface of said article and, while the deposited metal is still at high temperature, smoothing out surface ripples in the deposited layer of facing metal while preventing interalloying of the metal of said article with said facing metal sufficient to soften the deposited metal.

15. Process for forming a coating of a nonferrous hard-facing metal upon a cylindrical metal article, which comprises uniformly rotating said article upon its longitudinal axis, preheating successive portions of the surface of said article along a spiral path by means of an oxy-fuel gas carburizing flame, concurrently preheating a body of hard-facing metal and feeding the latter by gravity into contact with successive portions of the thus preheated surface of the article while concurrently melting a thin layer of the surfacing metal and welding it to the contacted surface of the moving article, thereby depositing at a uniform rate within a welding zone a continuous layer of molten facing metal in a spiral path upon the surface of said article, while concurrently feeding a flux at a uniform regulated rate to the welding zone and, while the deposited metal is at high temperature, smoothing out irregularities in the surface contour of said deposited metal, thereby producing a continuous welded coating of uniform thickness upon said article.

16. Process for forming a uniform surface coating of wear-resistant alloy upon the cylindrical surface of a metal article, which comprises rotating said article, directing a preheating carburizing flame along a spiral path on the surface of said article, said last-named flame providing sufficient heat to raise successive thin surface portions of the metal of said article to a welding temperature, adjacent convolutions of said spiral path having overlapping side margins, preheating a body of said coating alloy by means of a carburizing flame providing sufficient heat to melt a thin film of said coating alloy, contacting said film of molten coating alloy with said heated surface portions of the article, thereby welding the preheated coating alloy to said preheated surface portions, in the presence of a carburizing flame, along a spiral path coinciding with the first-named spiral path, while preventing excessive interalloying of the metals of the coating alloy and of the article acting to soften the deposited metal.

17. Process for forming a uniform welded-on metallic surface coating upon a cylindrical surface of a metal article, which comprises directing a preheating carburizing flame along a spiral path on the surface of said article, adjacent convolutions of said spiral path having overlapping side margins, preheating a body of said coating metal by means of a carburizing flame, contacting said preheated body with said preheated surface metal of the article, melting the preheated coating metal and said preheated surface metal, in the presence of a carburizing flame, along a spiral path coinciding with the first-named spiral path, while preventing excessive interalloying of the metals of the coating and of the article, and smoothing out irregularities in the surface conformation of the deposited metal substantially as rapidly as formed and while the deposited metal is still at a high temperature.

18. Apparatus for forming a uniform welded-on metallic surfaces coating upon a surface of revolution on a metal article, which comprises a device for supporting said article for rotation upon the axis of revolution of said surface; mechanism for rotating said article upon said axis at a uniform selected rate; means for supporting a body of facing metal upon and in contact with said surface; torch means adapted to be arranged adjacent said surface and such body of facing metal for heating a spirally shifting zone on the surface of said article, and for melting the facing metal and for welding the latter upon the adjacent surface of said metal article; torch means adapted to be arranged adjacent said surface and to follow said last-named torch means for smoothing out irregularities in the surface conformation of the facing metal thus deposited; and mechanism for moving all of said means as a unit at a selected uniform rate longitudinally of said axis of revolution.

19. Apparatus for forming a metallic surface coating upon the cylindrical surface of a cylindrical metal article, which comprises a device for supporting said article for rotation upon its longitudinal axis; means for rotating said article upon its longitudinal axis at a uniform selected rate; means for supporting a body of facing metal upon and in contact with the cylindrical surface of said article; torch means adapted to be arranged adjacent such surface and in advance of such body of facing metal for preheating a spirally shifting zone on the surface of said article; torch means adapted to be arranged adjacent such surface and such body of facing metal for melting the facing metal and for depositing and welding the same upon the adjacent surface of said metal article; means adapted to follow such torch means for bringing a chilling medium into heat transfer relation with the metal thus deposited; torch means adapted to be arranged adjacent such surface and to follow said last-mentioned torch means for smoothing out irregularities in the surface conformation of the deposited facing metal; and automatic means for moving the respective torch means and the facing metal supporting means as a unit at a uniform rate lengthwise of said supporting means and along paths respectively parallel to the longitudinal axis of said article.

20. Apparatus for forming a metallic surface coating upon the cylindrical surface of a cylindrical metal article, which comprises a device for supporting such article for rotation upon its longitudinal axis; means for rotating said article upon its longitudinal axis at a uniform selected rate; means for supporting a body of facing metal upon and in contact with the cylindrical surface of said article; torch means adapted to be arranged adjacent such cylindrical surface and in advance of such body of facing metal for preheating a spirally shifting zone on the surface of said article; torch means adapted to be arranged adjacent to such surface and such body of facing metal for preheating a body of facing metal in contact with said article; torch means adjacent to said last-named torch means for melting the preheated facing metal and for depositing and welding the same upon the adjacent surface of said metal article in a progressively shifting welding zone; torch means adapted to be arranged adjacent such surface and to follow all of said other torch means for smoothing out irregularities in the surface conformation of the deposited facing metal; means for moving the several torch means in unison longitudinally of and parallel to such surface; and means associated with at least one of said torch means for feeding a flux at a uniform regulated rate to said torch means and thence to the welding zone.

21. Apparatus for forming a metallic surface coating upon the cylindrical surface of a cylindrical metal article, which comprises means for supporting such article for rotation upon its longitudinal axis; means for rotating said article upon its longitudinal axis at a uniform selected rate; means for supporting a body of facing metal upon and in contact with such surface of said article; torch means adapted to be arranged adjacent such cylindrical surface and in advance of such body of facing metal for preheating a spirally shifting zone on the surface of said article; torch means adapted to be arranged adjacent to such surface and such body of facing metal for preheating a body of facing metal in contact with said article; torch means adjacent to said last-named torch means for melting the preheated facing metal and for depositing and welding the same upon the adjacent surface of said metal article in a progressively shifting welding zone; means for bringing a chilling medium into heat transfer relation with the metal thus deposited; and torch means adapted to be arranged adjacent such surface and to follow all of said other torch means for smoothing out irregularities in the surface conformation of the deposited facing metal.

22. Apparatus for forming a uniform welded-on metallic coating upon a surface of revolution of a metal article, comprising a device for supporting said article for rotation upon the axis of revolution of such article with such surface in position to receive a surface coating; mechanism for rotating said article upon said axis; means for supporting a body of facing metal upon said surface in contact therewith; torch means adapted to be arranged adjacent such surface and such body of facing metal for heating a zone on said surface, and for melting the facing metal and for depositing and welding the latter upon said surface within said zone; means arranged in position to follow said torch means and said means for supporting a body of facing metal, for bringing a cooling medium into heat transfer relation with the deposited metal; and mechanism for moving all of said means as a unit at a selected uniform rate longitudinally of said axis of revolution.

WILLIAM ARTHUR WISSLER.

CERTIFICATE OF CORRECTION.

Patent No. 2,295,702.  September 15, 1942.

WILLIAM ARTHUR WISSLER.

It is hereby certified that error appears in the printed specification of the above numbered patent requiring correction as follows: Page 1, second column, line 39, for "1,73,341" read --1,973,341--; page 5, second column, line 54, claim 10, for the word "pressure" read --temperature--; page 6, second column, line 37, claim 18, for "surfaces" read --surface--; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.